US008564220B2

(12) United States Patent
Matthews et al.

(10) Patent No.: US 8,564,220 B2
(45) Date of Patent: Oct. 22, 2013

(54) LIGHTING DEVICE, LIGHTING SYSTEM, AND METHOD OF USE

(76) Inventors: Dan R. Matthews, Gilbert, AZ (US);
Kurt Kuhlmann, Santa Clara, CA (US);
Joshua Seal, Los Angeles, CA (US)

( * ) Notice: Subject to any disclaimer, the term of this patent is extended or adjusted under 35 U.S.C. 154(b) by 336 days.

(21) Appl. No.: 13/112,893

(22) Filed: May 20, 2011

(65) Prior Publication Data
US 2011/0285315 A1    Nov. 24, 2011

Related U.S. Application Data

(60) Provisional application No. 61/346,898, filed on May 20, 2010.

(51) Int. Cl.
*H05B 37/02* (2006.01)
(52) U.S. Cl.
USPC ............ 315/291; 315/297; 315/307; 362/183
(58) Field of Classification Search
USPC .................. 315/291, 294, 297, 307; 362/183; 310/73
See application file for complete search history.

(56) References Cited

U.S. PATENT DOCUMENTS

| 6,690,141 | B1 * | 2/2004 | Yu ................................ 320/107 |
| 7,109,668 | B2 * | 9/2006 | Pogodayev et al. ........... 315/307 |
| 2008/0246416 | A1 * | 10/2008 | Jones et al. .................... 315/294 |
| 2011/0050171 | A1 * | 3/2011 | Ron et al. ...................... 320/114 |

* cited by examiner

*Primary Examiner* — Jason M Crawford
(74) *Attorney, Agent, or Firm* — Parsons Behle & Latimer

(57) ABSTRACT

A portable lighting device having one or more inputs, at least a first and second output, one or more light sources, an input sensor, an output sensor, an adaptive buck converter, a boost mechanism, an internal power source, and a controller. The input sensor is coupled to the one or more inputs and the output sensor is coupled to the first output. The input and output sensors are coupled to the adaptive buck converter and the boost mechanism and also to the controller. The controller is configured to instruct the adaptive buck converter to condition power inputs at the one or more inputs. The controller is configured to instruct the boost mechanism to boost a stored output from the internal power source.

21 Claims, 13 Drawing Sheets

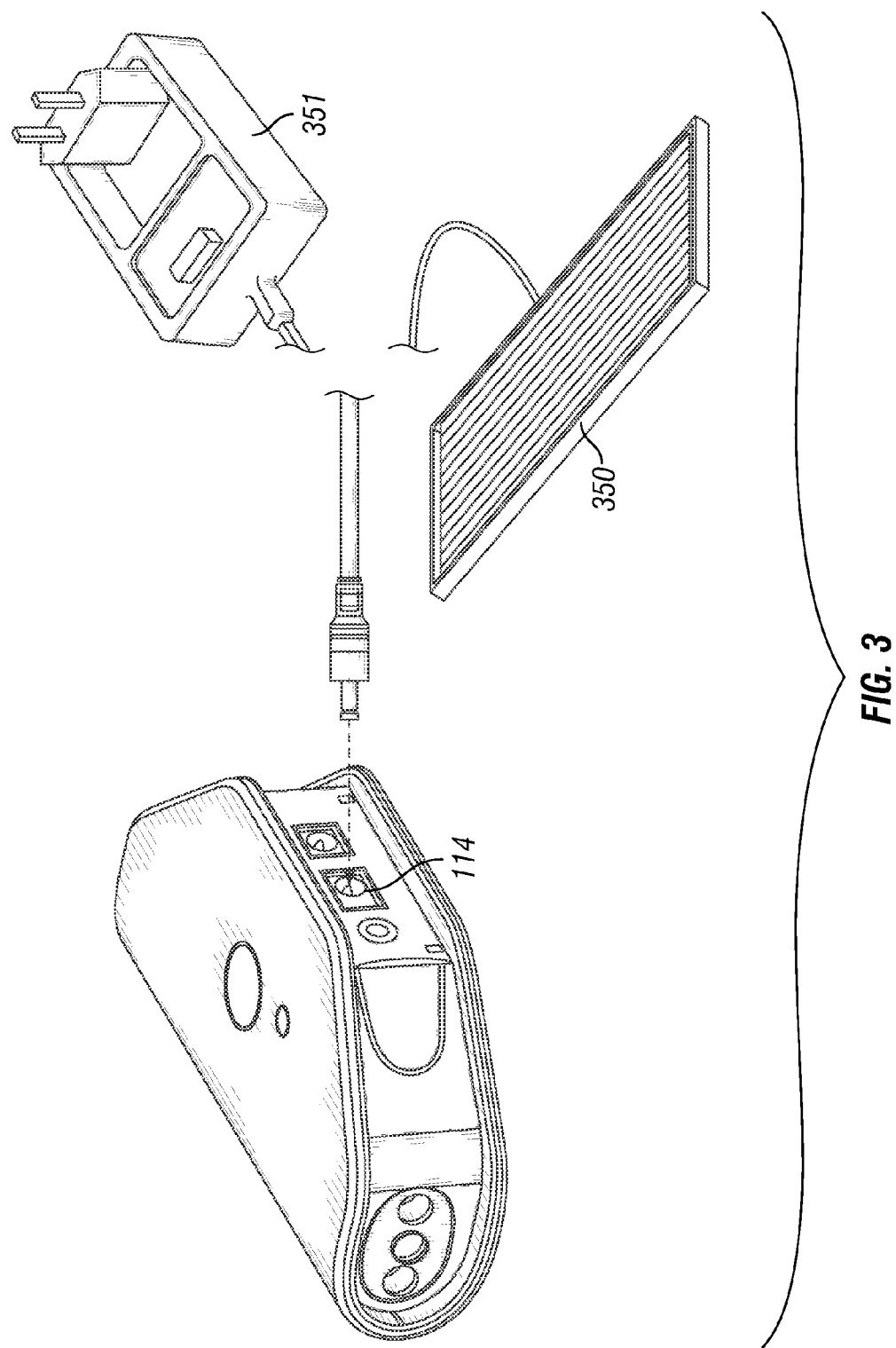

LIGHTING DEVICE, LIGHTING SYSTEM, AND METHOD OF USE

CROSS REFERENCE TO RELATED APPLICATIONS

This application claims priority to and incorporates by reference, in its entirety, U.S. Provisional Patent Application No. 61/346,898 entitled "LIGHTING DEVICE, LIGHTING SYSTEM, AND METHOD OF USE" and filed on May 20, 2010.

BACKGROUND

The most common solutions for lighting in the developing world are various candles, lamps, and lanterns. When electric lighting is available, for reasons of cost, it is often implemented with a single lamp in the center of the room or ceiling. The users must select their position to gain favorable lighting because when the light is behind them, it puts their hands and work in the shadows. Furthermore, objects in the room also cast shadows and diminish workable space. Ambient lighting can be poor because the walls are often bare cement or natural materials such as wood, mud, or clay brick. Walls can become even less reflective for ambient light because stove smoke often coats the walls in dark soot. These conditions lead to a desire by inhabitants of these dwellings for brighter lighting. The problem with brighter lighting when it comes from a single source is that the eyes then adjust to the brighter light and the shadows become even darker.

People in developing world environments often lack ready access to electricity, or their electricity can be undependable. Homes are often hand built and not made to keep out environmental conditions that can be highly damaging to products idealized for more protected conditions. Even so-called "outdoor" products fail in the day-to-day harshness of many developing world villages and slums. Despite the lack of resources and technology, the mobile phone is still prevalent in third world and developing countries and it is common for there to be at least one phone per family. The lack of reliable electricity can therefore affect the livelihood of people who gain working benefit from their mobile phone.

A further complication in the developing world environment is that replacement components and accessories and the technical expertise to employ them are difficult to find. The user therefore benefits from apparatus solutions that can be repaired or expanded with readily available components and with little technical knowledge. Furthermore, the user will often have little to no resources to maintain the device, and it will undergo possibly significant abuse, both environmental and electrical, since its users often live in harsh environments including rain, heat, cold, dust, salt in the air and water, and direct sunlight to name just a few. Therefore, a solution that is affordable and cheaply made is of interest. Otherwise, costs may prohibit the solution from serving the market for which it is intended.

This environment could benefit greatly from a device that can provide light over a diverse range of areas and situations, charge mobile phones, be readily expanded and repaired, and be recharged by a renewable resource such as sunlight. If made affordable enough, the device may even be able to pay for itself in improved revenue stability.

SUMMARY

There is a need for a flexible and adaptive power source and lighting device that is both inexpensive and durable.

In one embodiment, an electrical power source and lighting apparatus has one or more inputs and at least a first and second output, and the electrical power source and lighting apparatus includes one or more light sources, an input sensor coupled to the one or more inputs, an adaptive buck converter coupled to the input sensor, an internal power source coupled to the adaptive buck converter, a boost output mechanism coupled to the internal power source, an output sensor coupled to the boost output mechanism, and a controller connected to the input and output sensors, the adaptive buck converter, the internal power source, and the boost output mechanism. The input sensor is configured to sense the voltage and current at the one or more inputs. The adaptive buck converter is configured to receive a power input from the one or more inputs. The controller is configured to receive the sensed voltage and current values from the input sensor and instruct the adaptive buck converter as to how to condition the power input. The adaptive buck converter generates a conditioned power output and transmits it to the internal power source for storage. The output sensor is configured to sense the probable voltage and current requirements of a device coupled to the first output, and the boost output mechanism is configured to receive the stored output from the internal power source and boost the stored output consistent with the requirements sensed at the output sensor.

In one embodiment, a system for providing light includes a first, second, and third electrical device. The first electrical device has an internal power source, one or more first electrical connectors, an output sensor, a voltage boost module, and one or more first light sources. The output sensor is configured to detect the probable voltage requirements of any devices connected to the one or more first electrical connectors. The voltage boost module is configured to boost the first voltage to a second voltage based upon the probable voltage requirements detected by the output sensor. The second device includes one or more light sources and one or more second connectors configured to electrically couple to at least one of the one or more first electrical connectors. The third electrical device includes one or more third light sources and one or more third electrical connectors configured to electrically couple to at least one of the one or more second electrical connectors.

In one embodiment, a method of powering electrical devices includes coupling a first electrical device to a first output of an electrical power source and lighting apparatus, the electrical power source and lighting apparatus having one or more light sources, sensing the probable voltage and current requirements of the first electrical device with an output sensor coupled to the first output, and boosting an output power from an internal power source located in the electrical power source and lighting apparatus, wherein the boosting is controlled by a controller coupled to the output sensor such that the output power is consistent with the sensed voltage and current requirements. The method also includes coupling an external power source to a first input of the electrical power source and lighting apparatus, sensing the voltage and current of the external power source with an input sensor located in the electrical power source and lighting apparatus, conditioning a power input from the external power source with an adaptive buck converter to within a predetermined acceptable input threshold, generating a conditioned power output with the adaptive buck converter, and storing the conditioned power output in the internal power source.

BRIEF DESCRIPTION OF THE DRAWINGS

FIG. 3 illustrates an example of electrical device 100 coupling to external power sources solar panel 350 or AC power supply 351, according to one embodiment.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present application. The following detailed description is, therefore, not to be taken in a limiting sense.

Figure 1:
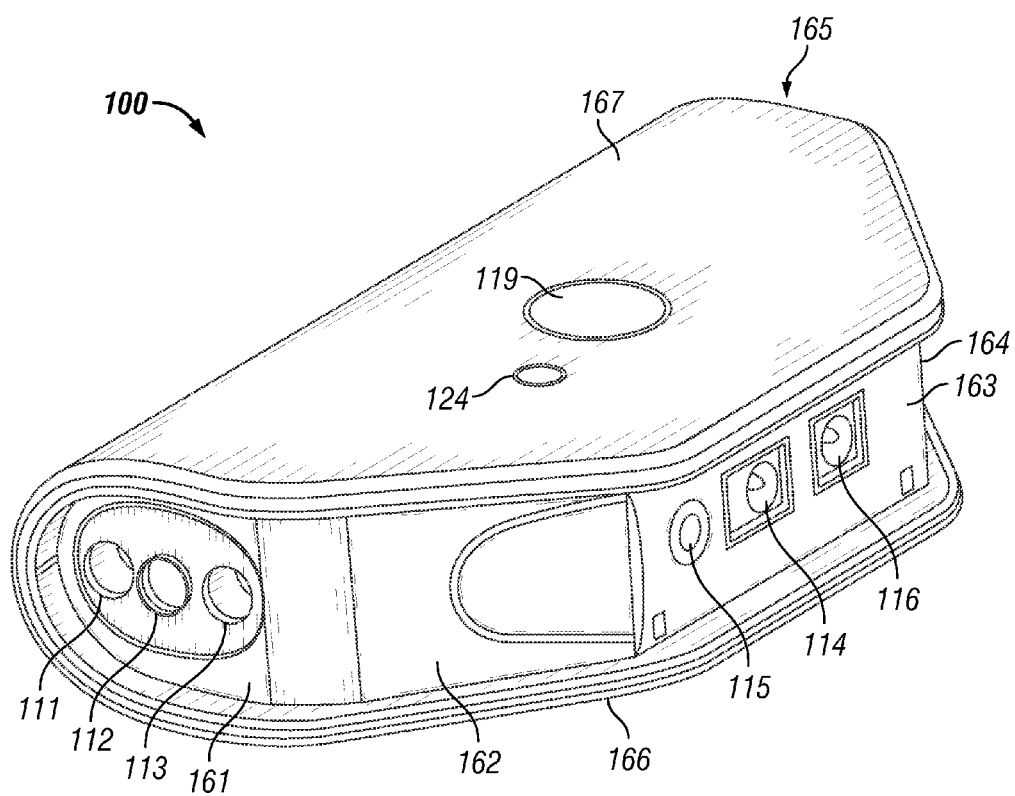
FIG. 1 illustrates right, front, bottom isometric view of electrical device 100, according to one embodiment.
Figure 4:
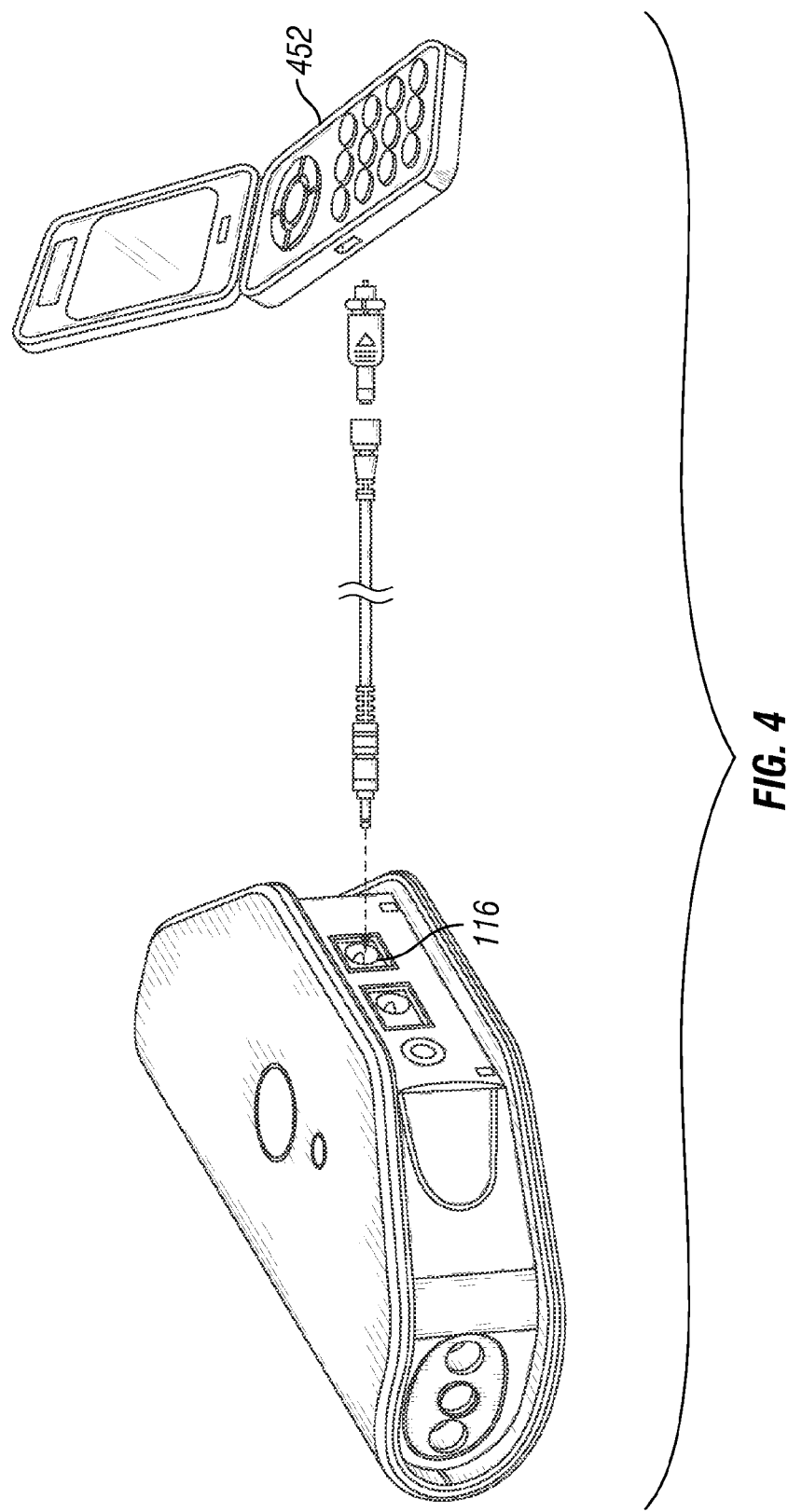
FIG. 4 illustrates an example of electrical device 100 coupling to an electrical device 452, according one embodiment.

FIG. 1 shows a simple example of the electrical device 100. The electrical device 100 can have a pocket-able form factor; the electrical device 100 can have charge output connectors 115 and 116 for recharging other electronic accessories or devices such as an external rechargeable device 452 and an external LED (light emitting diode) light node 501 (FIGS. 4 and 5, respectively); the electrical device 100 can have the light sources 111, 112, and 113 (e.g., white LED lamps) to provide light; the electrical device 100 can have a charge input connection 114 that can handle a variety or range of voltage inputs to make it more widely chargeable and an output connector 115 specifically configured for powering white LEDs. The output connectors 115 and 116 can be configured to protect against electrical failure such as a short or excessive load, and the electrical device 100 can also offer control of external LED lights and charge outputs. These external lights also could be plugged in series so as to allow more external lights to be added as desired, constituting a system for providing distributed lighting from a device that can charge mobile phones and be recharged by the sun.

In some embodiments, the electrical device 100 can be designed so that it can be hung on a wall, string, or wire, or placed on a table or shelf. In some embodiments, the electrical device 100 has a body with various surfaces in its body so that it could provide light at selectable angles simply by placing it down on one of its several sides or surfaces.

Figure 2A:
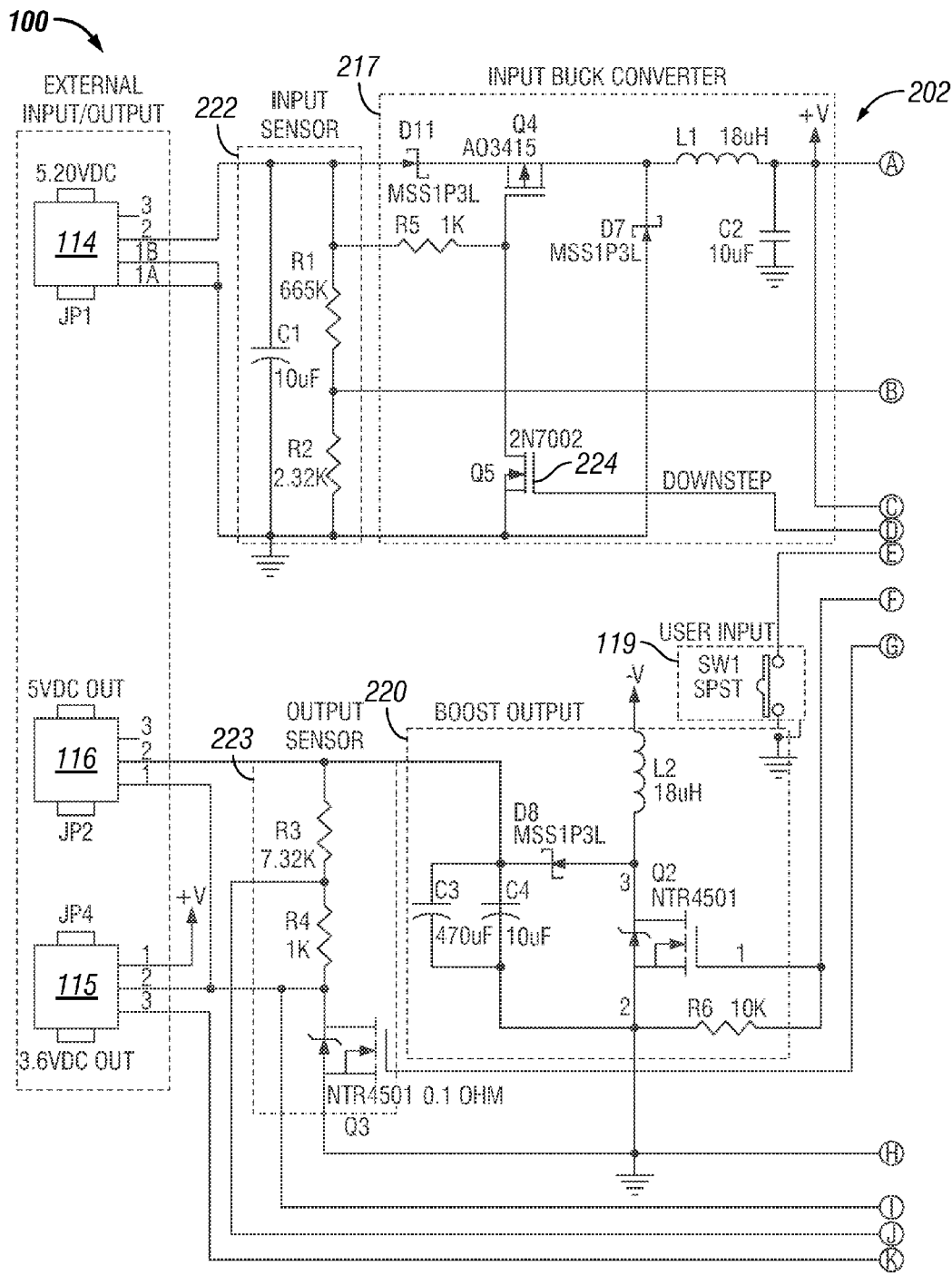
FIG. 2 illustrates a schematic of circuit 202 of electrical device 100, according to one embodiment.
Figure 2B:
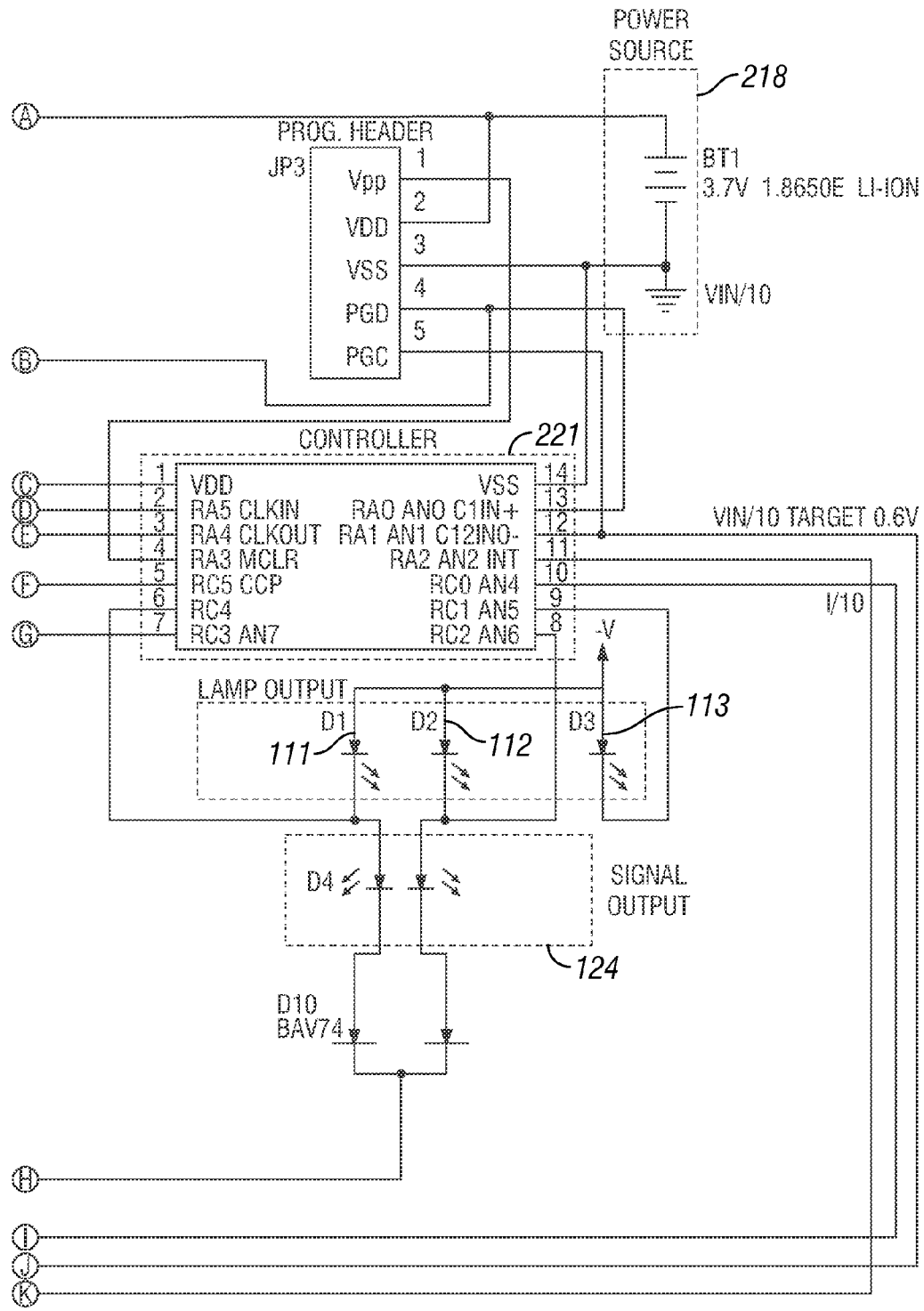

In some embodiments, the electrical device 100 can have an internal power source 218 (FIG. 2). The charge state of the internal power source 218 can be indicated with one or more signal outputs 124 (i.e., one or more LEDs). The LED(s) could dim or blink or change color to indicate the internal charge level for the internal power source 218. This signaling LED(s) or second separate LED or LEDs also could indicate the charging rate of an external device under charge. A signaling LED or LEDs also could indicate the rate of charge going out of the electrical device 100 into the external electrical device being charged.

In some embodiments, the electrical device 100 can have one or more output connectors 115 and 116 for driving external devices. For example, fans and radios could be driven from the output connectors 115 and 116 for the external LED lights or phones. An automotive cigarette lighter adapter (CLA) output could be provided such that any accessory capable of being powered from a CLA could be powered by this device. Even DC (direct current) to AC (alternating current) output inverters could be coupled to the CLA thereby enabling the electrical device 100 to be a backup power device, charged from a wall adapter, and providing an AC output, whilst having provisions for driving other accessories or charging other devices.

In some embodiments, the electrical device 100 can be designed to control these various power outputs with a button or buttons or other signaling input such as a dial or knob or slide. Various combinations of output could then be handled separately from the electrical device 100. Each electrical accessory (e.g. electrical device 501 (FIG. 5) or a single LED light node 701 (FIG. 7)) or other electrical device can be built without any power source or source converter or regulator because the electrical device 100 would regulate the electrical power. This control by the electrical device 100 can enable the manufacturing of cheaper accessories, such as a fan or radio, because they can be made without the power control circuit. Therefore an embodiment of the electrical device 100 could be charged using a solar panel 350, provide charge output for charging accessories such as mobile phones, provide specialized power outputs for driving raw LED devices or fans or other devices. These accessories, thus, can be manufactured more cheaply, and have power control options if the electrical device 100 is utilized as the power source.

Referring to FIGS. 1 and 2, an electrical device or apparatus 100 can include: (a) one or more light sources 111, 112, and 113; (b) one or more input connectors 114 configured to received at least a first electrical power with a first voltage; (c) an input buck converter 217 (FIG. 2) electrically coupled to the input connectors 114 and configured to condition the first electrical power received by the input connectors 114; (d) an internal power source 218 (FIG. 2) configured to received the second electrical power with the second electrical power from the input buck converter 217 and store the second electrical power; (e) a user input mechanism 119; (f) a boost output mechanism 220 (FIG. 2) configured to receive a third electrical power with a third voltage from the internal power source 218; (g) one or more output connectors 115 and 116 configured to provide at least the fourth electrical power to one or more first electrical devices; (h) a controller or control mechanism 2211 (FIG. 2) configured to control at least the input buck controller 217, the boost output mechanism 220, and the internal power source 218; (i) an input sensor 222 (FIG. 2); (j) an output sensor 223 (FIG. 2); (k) one or more signal outputs 124; and (l) a controller module 1940 (FIG. 19) configured to run on the controller 221. In some embodiments, the electrical device 100 can have at least sides or surfaces 161, 162, 163, 164, 165, 166, and 167.

In one possible embodiment, an electronic circuit 202 can be utilized to control the various features of the electrical device 100. In some embodiments, the electrical device 100 can be used to recharge the external device 452 (FIG. 4) (e.g., a mobile phone) over a wide DC voltage range. In one embodiment, the electrical device 100 can be configured to recognize when an external device 452 can operate with suboptimal voltage or current input and can therefore reduce the voltage or current transferred to the external device 452 in order to conserve power in the internal power source 218. In some embodiments, the electrical device 100 can provide light by using the light sources 111, 112, and 113 (e.g., integrated LED lamps), and can also drive a power bus idealized for light sources (e.g., LEDs), which can be external to the electrical device 100 (e.g., electrical device 501). These external light sources are especially helpful because they allow for light to be distributed at differing locations around a room or area and the external light sources can be aimed individually to provide best lighting in differing areas, such as over a stove, in a work area, or for ambient low light such as for socializing conversation. In some embodiments, the circuit 202 supports these features and is highly adaptable to support other features; the circuit 202 can be configurable to provide a wide range of voltage and current requirements. This allows external devices (e.g., electrical device 501) to have little or no internal circuitry and therefore reduces their cost and complexity.

Because the electrical device 100 is operated by the controller 221, more user selectable features can be added to the electrical device 100 such as dimming or timed on and off modes for the light sources 111, 112, and 113, and a sleep mode. In some embodiments, the controller 221 can verify input and output integrity and switch various stages of the circuit on or off as needed. These features become automatic to the circuit 202, and can also be devised to be fail safe features so that inputs or outputs are shut off if their connection becomes compromised and the electrical device 100 is being made to operate outside of its intended range of voltages or currents.

In some embodiments, the input connectors 114 are electrical coupling or connectors that are designed to receive electrical power to charge the internal power source 218. In some embodiments, input connector can receive a predetermined range of voltages. For example, in one embodiment the input connectors 114 can be configured to receive electrical power from five volts to twenty volts DC (direct current). In another example, the input connectors 114 can receive voltages in the range of zero to twenty-five volts DC. In some embodiments, the input connectors 114 can provide the electrical power to the input sensor 222. As shown in FIG. 3, the input connector 114 can be coupled to, for example, a solar panel 350 or an external plug 351 to receive electrical power.

In some embodiments, the output connectors 115 and 116 are electrical coupling or connectors that are designed to supply electrical power to other electrical devices. In some embodiments, the electrical power supplied to other electrical device is from the internal power source 218. The electrical power provided by the output connectors 115 and 116 can be used for recharging external accessories or powering other electrical devices such as lamps, fans, or radio.

In some embodiments, each of output connectors is configured to provide a different voltage or current. For example, the output connector 115 can provide a first constant average voltage (e.g., 3.6 volts DC) to other electrical devices, in some embodiments, the output connector 116 can provide a second constant average voltage (e.g., 5.0 volts DC) to other electrical devices.

One type of external output made possible by the electrical device 100 is a power managed external output. Many devices, such as LEDs and fans, can be driven by a waveform that might not be suitable for other digital devices. Instead of requiring a very smooth power profile they might require a highly managed power profile, such that they are driven in their most efficient zone of operation, are not allowed to be over-driven lest they become damaged or weakened, and the output can be controlled to maximum benefit as desired by the user. Light brightness and fan speed are two examples of outputs made possible by a highly managed system. In some embodiments, using the controller 221 and either of the output connectors 115 and/or 116 can provide this type of output power.

In some embodiments, the input sensor 222 can be configured to provide a scaled electrical signal to the controller 221 that allows the controller 221 to make decisions about managing the charge input. If the voltage received by the input sensor 222 from the input connections 114 is out of a predetermined acceptable range (e.g., 5 volts to 20 volts DC), the input connections 114 can be turned off to protect the rest of the internal circuitry, or the input voltage can be cycled so that its charge rate is acceptable.

In some embodiments, the input buck converter 217 is configured to condition the electrical power received from the input sensor 222. That is, the electrical power received by the input connection 114 can need conditioning before it can be used to charge an internal power source 218 or be applied to other parts of the circuit for extended periods. In some embodiments, the input buck converter 217 can condition incoming electrical power by chopping it to lower levels and smoothing the incoming electrical power with inductance. In some embodiments, the controller 221 can control the input buck converter 217 and the conditioning of the incoming electrical power, in some embodiments, the controller 221 receives the scaled electrical signal from the input sensor 222 and is able to determine what conditioning the incoming electrical power requires. In some embodiments, the controller 221 can use the input buck converter 217 to properly condition the incoming electrical power. For example, the controller 221 can turn on and turn off the transistor 224 at proper intervals to control the chopping and smoothing of the incoming electrical power. Because the controller 221 can directly manage the input buck converter 217, decisions can be made in software, in the controller 221, or with dedicated gate structures that make a very wide range of power input possible. In one embodiment, the input buck converter 217 is an adaptive buck converter configured to maximize adaptive loading and derive a maximum power loading from the incoming electrical power.

In some embodiments, the internal power source 218 can be a battery. In one embodiment, the internal power source 218 can receive the electrical power after conditioning by the input buck converter 217. The electrical power can be used to charge the internal power source 218. In one embodiment, the circuit 202 can run from the internal power source 218, which allows the electrical device 100 to be portable. Additionally, one or more external devices (e.g., electrical devices 452 (FIG. 4)) can be charged or operated using electrical power from the internal power source 218. In other embodiments, the internal power source 218 can be replaced by a number of electrical power sources including solar panel or external battery. In some embodiments, the controller 221 can use coulomb charge counting to measure the charge on the internal power source 218.

In one embodiment, the user input mechanism 119 can be configured to receive user input. For example, the user input mechanism 119 can be a switch to allow the user to select modes of operation or to request information from the device. For example, one click of the user input mechanism 119 can turn on the light source 112; two clicks of user input mechanism 119 can turn on the light sources 111 and 113; three clicks of user input mechanism 119 can turn on the light sources 111, 112, and 113. In some embodiments, the controller 221 can read presses of the user input mechanism 119 and react according to its programming and the conditions present to make decisions about what to signal and how to operate the functions of the circuit 202. In one embodiment, the user input mechanism 119 can include any number of inputs or combinations of inputs. For example, dials could be used to control light levels or fan speed, light sensors could set light levels and allow shut off or dimming to save power when ambient light is sufficient.

In one embodiment, the boost output mechanism 220 can be used to change the voltage of the electrical power received from the internal power source 218. In some embodiments, the output voltage of one or more of output connectors 115 and 116 is higher than the voltage of the internal power source 218 and the voltage of the electrical power will need to be boosted before the electrical power is provided to output connectors 115 and 116. For example, the internal power source 218 could output electrical power at 3.6 volts DC and a manufacturer of the electrical device 100 can want to output five volts DC with the output connector 116.

In one embodiment, the boost output mechanism 220 can accomplish the voltage boost through an inductive boost circuit that uses a flyback technique to generate higher voltage by switching current into an inductor at programmable frequency and pulse width which generates the desired output power which is then captured onto a capacitor and measured with the output sensor 223 for feedback. The rate and length of the pulses determine the final output power attributes which combine to allow for control of voltage and current. In one embodiment, the controller 221 can be programmed to consider these power conditions and react accordingly (e.g., by controlling or limiting the electrical power to the boost output mechanism 220, boosting the electrical power, attenuating the electrical power, or shutting the electrical power off completely). In some embodiments, the boost output mechanism 220 or the input buck converter 217 can perform maximum power point tracking. In various examples, use of the boost output mechanism 220 in combination with the output sensor 223, and the controller 221 allows the electrical device 100 to handle a variable load on the output connector 116 while provide a constant average voltage (e.g., five volts DC) to the output connector 116.

In one embodiment, the output sensor 223 can be configured to provide a scaled electrical signal to the controller 221 that allows the controller 221 to make decisions about managing the output electrical power. That is, while the controller 221 determines the power profile of the power outputs, its decisions are made based on measurements of current and voltage of the output ports. In one embodiment, the output sensor 223 enables this feedback and allows for a highly sophisticated programmatic response.

In one embodiment, the signal output 124 can be used to convey information about the operation of the electrical device 100 to the user of the electrical device 100. In one embodiment, the controller 221 uses the circuit 202 to control the functioning of the electrical device 100 and acquire feedback but the user must be signaled in a manner perceivable to humans. In some embodiments, the signal output 124 can be a two color LED. The two color LED is used to signal various states and modes of operations. In other embodiments, additional LEDs, LCD (liquid crystal device), buzzers, or other signaling devices can be used. In one embodiment, the signal output 124 allows the electrical device 100 to show the charge level of the internal power source 218 by indicating green with fully charged, red for uncharged, and shades of red/green to show various intermediate levels of changed. In one embodiment, the signal output 124 can also blink to indicate it is charging, or to indicate an error condition.

In some embodiments, the light sources 111, 112, and 113 can be white LEDs. For example, the light source 111 and 112 can be flood LEDs (e.g. wide angle light LEDs), and the light source 112 can be a spot light (e.g. a focused beam LED). In other embodiments, other sources of light and other types of LEDs can be used for the light sources 111, 112, and 113.

In one embodiment, the controller 221 can be used to control the circuit 202. One of the keys to the sophisticated operation of the circuit 202 is the dynamic control made possible by the controller 221. In some embodiments, the controller 221 can be a microprocessor. In one embodiment, the controller 221 can execute one or more program (stored in either internal memory or external memory) to react to inputs, user stimulus, and output behavior in order to make decisions about how best to manage a set of conditions. Use of the controller 221 and the controller module 1940 (FIG. 19) can enable a wide range of electrical power inputs, a wide range of electrical power outputs, and user input guided state selection. The electrical device 100 can be put into modes of operation that are entirely controlled by the controller 221. Examples of these modes include turning lights on or off, dimming lights, enabling input ports, signaling charge levels and so on. In some embodiments, the controller 221 can be a microprocessor other solid state circuits, such as ASIC (application-specific integrated circuit) or gate array technology, that can be used for managing the various input and output requirements of the electrical device 100.

In some embodiments, the controller 221 executes a controller module 1940, which is stored in the memory of the controller 221. In some embodiments, the controller module 1940 is firmware that enables a wide range of circuit behavior that would generally be done by other possibly expensive dedicated circuits. There are boost and buck regulators available, as well battery charge controllers and LED light driver buffers. The controller methodology described here allows for much of this functionality to be brought into firmware and handled on-chip by the controller. The controller has its internal program with thresholds and actions depending from conditions that enable it to take the best course of action for each circuit structure. In one embodiment, the controller module 1940 can determine how the controller 221 manipulates its output structures and it is informed by data derived from its input structures. The controller module 1940 can function in software in was that would normally be derived in hardware.

Figure 19:
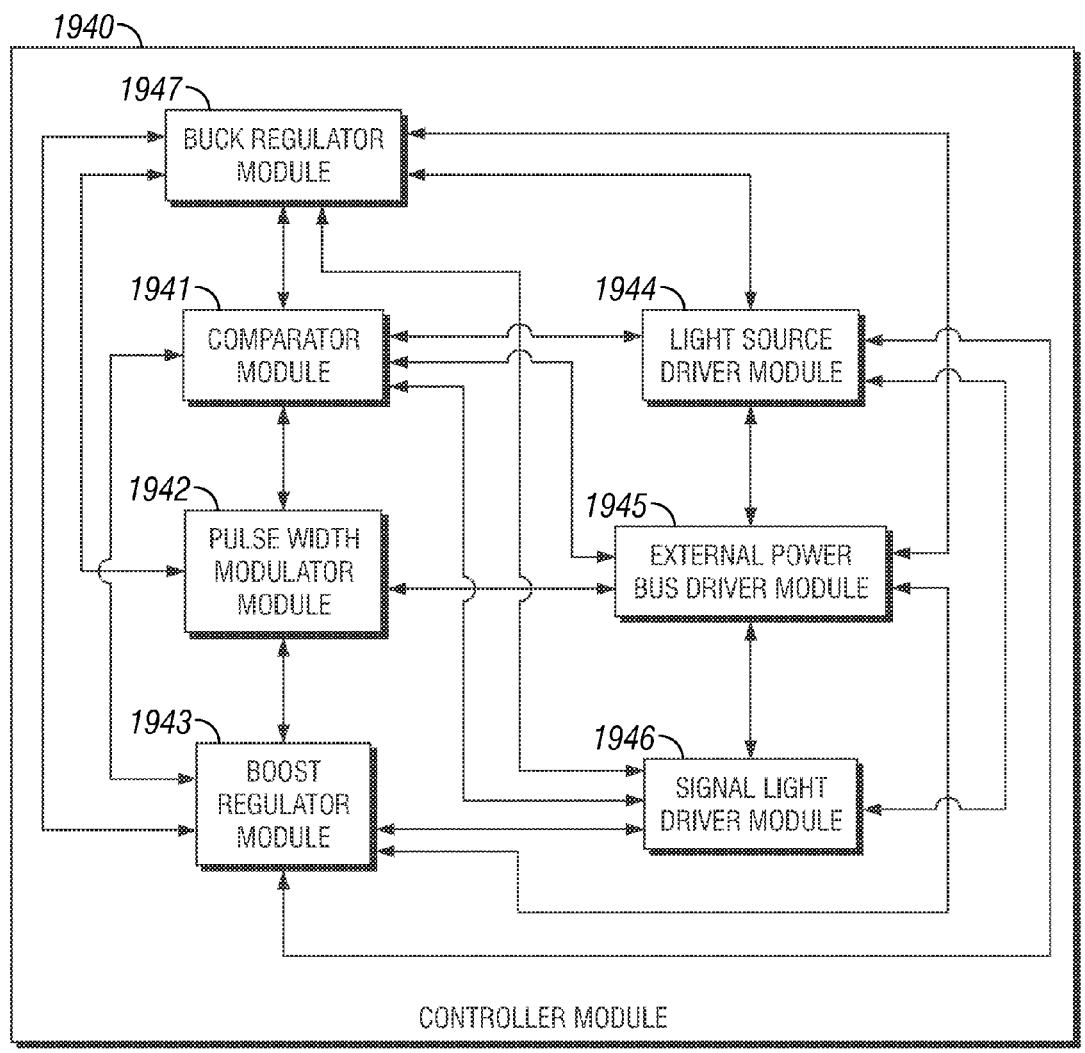
FIG. 19 illustrate a block diagram of a controller module 1940 configured to run on controller 221 (FIG. 2), according to one embodiment.

Referring to FIG. 19, in some embodiments, the controller module 1940 can be configured to run on the controller 221. In one embodiment, the controller module 1940 can include: (a) a comparator module 1941; (b) a pulse width modulator module 1942; (c) a boost regulator module 1943; (d) a light source driver module 1944; (e) an external power bus driver module 1945; (f) a signal light driver module 1946; and (g) a buck regulator module 1947.

In one embodiment, the comparator module 1940 can be configured to measure output and input voltages against predetermined thresholds and taking appropriate action. For example, in some embodiments, the output connector 116 should maintain a constant voltage over a variable load, and the controller module 1940 can read the actual output voltage through the output sensor 223 and adjust its output to the boost output mechanism 220 accordingly.

In one embodiment, the Pulse Width Modulator (PWM) module 1942 can control the chopping of electrical power. In one embodiment, the PWM module 1942 can administer the chopping of the input or output electrical power as needed and the smoothing of it with inductance to make it acceptable. In one embodiment, the PWM module 1942 is both built in and created in the controller module 1940 depending on the needs of the circuit. In one embodiment, the accuracy of control needed can determine the method is used in some embodiments. In one embodiment, the controller 221 tracks its performance and adjust its controller module 1940 accordingly based on the desired thresholds configured in memory and feedback from the circuit 202. The PWM module 1942 and feedback can be used in combination to enable failsafe features as well, allowing for input and outputs structures to be turned off if their connection becomes compromised.

In one embodiment, the output charging voltage of the output connector 116 (or other output connectors) can be higher than the voltage of the internal power source 218, and in some embodiments, the boost regulator module 1943 is implemented partially internally to the controller 221 to allow for a lower cost circuit and finer control of the boosting. In one embodiment, the inductor is driven and switched off for flyback to create the boosted voltage and the boost regulator module 1943 assesses the level generated and adjusts its PWM output accordingly.

In one embodiment, the voltage of the electrical power received by the input connectors 114 can be higher than the voltage of the internal power source 218 and allow for proper charging without damage to the battery the input voltage is controlled by chopping the incoming power and smoothing it with inductance. In one embodiment, the buck regulator module 1947 is able to adjust frequency and pulse width as desired for best power control. In some embodiments, the external electrical power source might be a solar panel with high voltage but very low current capacity, in which case the buck regulator module 1947 would adjust its behavior to present a high impedance load so the solar panel voltage is not overloaded and the solar panel can therefore operate in its best range. If the buck regulator module 1947 detects little or no droop in supply power, the buck regulator module 1947 can decrease load impedance and draw more charging current to replenish the internal supply more quickly.

In some embodiments, super bright LEDs need a high current drive stage, using the light source driver module 1944, the LEDs can be driven directly, or otherwise the circuit 202 may require a buffering transistor or other drive circuit. Thus, in one embodiment, the light source driver module 1944 has a high drive output, and manages the electrical power to the light sources.

In one embodiment, the external power bus driver module 1945 can be used to control electrical power to external light sources coupled to the output connector 115 (and/or other output connectors). The electrical power through the external power bus driver module 1945 is constantly and/or regularly monitoring the electrical power to the output connector 115 (and/or other output connectors) to assure the proper power profile is applied in some embodiments, this output could be tuned also to be idealized for other external devices, such as a fan or radio or other DC device. In some embodiments, the output is intended to drive at the voltage best suited for raw LEDs, meaning the external device needs no other circuitry. The LEDs can be placed inside a housing and coupled to the electrical device 100. The electrical device 100 can take care of all power needs of the external electrical devices.

In one embodiment, the signaling LED can be driven directly using the signal light driver module 1946. In other embodiments, the signal LEDs can be buffered with a transistor or other buffer circuit. In various examples, a bi-color (Red/Green) LED is used and the signal light driver module 1946 can signal its message to the user with variations of blinks, color change, and brightness.

Furthermore, as shown in FIGS. 11-14, various surfaces or sides of the electrical device 100 can rest on the surfaces 1191 (FIGS. 11, 13, and 14) or 1292 (FIG. 12) while providing light. In the embodiment shown in FIG. 11, the side 165 can rest on the surface 1191 and the electrical device 100 can act as a room lamp. In various embodiments, the angle 1150 can be approximately 30 degrees or approximately 45 degrees. In other embodiments, the angle 1150 can be between 20 degrees and 60 degrees.

Figure 12:
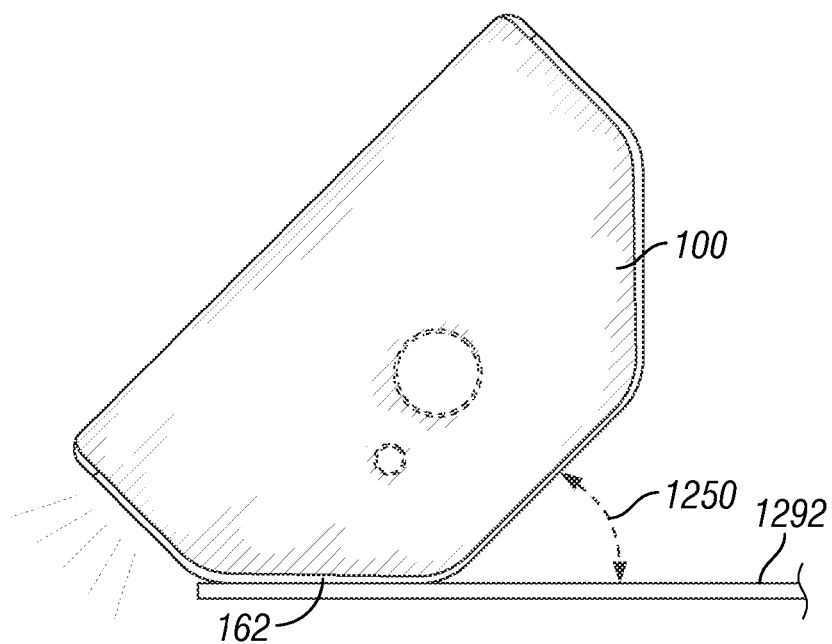
FIG. 12 illustrates a further example of a use of electrical device 100, according to one embodiment.

In the example shown in FIG. 12, the electrical device 100 can rest on a shelf or other surface with the side 162 resting on the surface 1292. In this embodiment, the electrical device 100 can act as a reading lamp or room light. In various embodiments, the angle 1250 can be approximately 30 degrees or approximately 45 degrees. In other embodiments, the angle 1250 can be between 20 degrees and 60 degrees.

Figure 13:
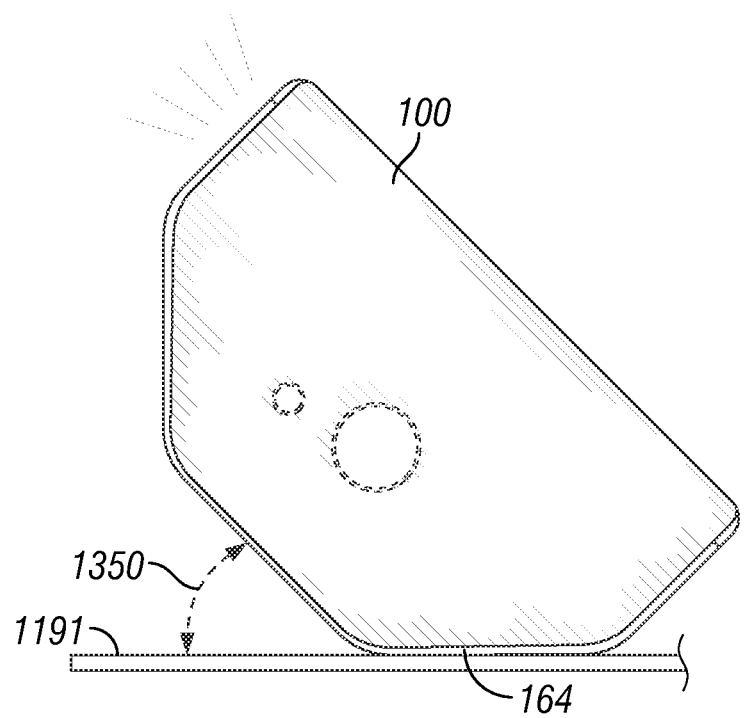
FIG. 13 illustrates another example of a use of electrical device 100, according to one embodiment.

In the example shown in FIG. 13, the surface 164 of the electrical device 100 can rest on the surface 1191, and the electrical device 100 can act as a table lamp. In various embodiments, the angle 1350 can be approximately 30 degrees or approximately 45 degrees. In other embodiments, the angle 1350 can be between 20 degrees and 60 degrees.

Figure 14:
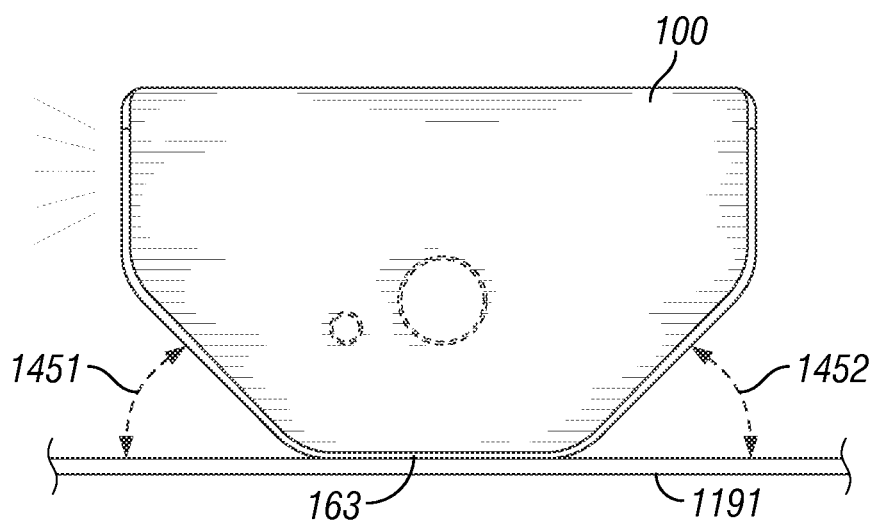
FIG. 14 illustrates a still further example of a use of electrical device 100, according to one embodiment.

Furthermore, in the embodiment shown in FIG. 14, the surface 163 can rest on the surface 1191 and shine light across the surface 1191. The angles 1451 and 1452 can be equal in some embodiments. For example, the angles 1451 and 1452 can be approximately 30 degrees or approximately 45 degrees. In other embodiments, the angles 1451 and 1452 can be between 20 degrees and 60 degrees.

In some embodiments, the light sources 111 and 113 can be flood LEDs, and the light source 112 is a spot light LED. When the electrical device 100 is being used to provide light to a room, in some embodiments, only the light sources 111 and 113 are turned-on. In other embodiments, all three of the light sources 111, 112, and 113 are turned-on.

In some embodiments, a method of using the electrical device 100 comprises: coupling at least one of the input connectors 114 to an external power source; receiving electrical power from the external power source; using the input sensor 222 and the controller 221 to read the voltage of the incoming electrical power; using the controller 2211 to calculate adjustment to the voltage needed; adjusting the input buck converter 217 such the input buck controller 217 outputs the electrical power with the desired voltage; storing the electrical power in the internal power source 218.

Another method of using the electrical device 100 includes: coupling the output connector 116 to an external electrical device; begin sending electrical power to the external electrical device; using the output sensor 223 and the controller 221 to read the voltage of the outgoing electrical power; using the controller 221 to calculate adjustment to the voltage needed such that electrical power with a (predetermine constant average voltage is provided to the external electrical device; adjusting the boost output mechanism 220 such that the boost output mechanism 220 outputs electrical power with a predetermine constant average voltage; providing electrical power with a predetermine constant average voltage to the external electrical device.

In some embodiments, the electrical device 100 can be designed such that all features can operate in unison, enabling the electrical device 100 to be charged, provide tight, charge an external device, all simultaneously.

In some embodiments, the electrical device 100 can be designed such that to lock out some features in preference to another in order to save cost or to operate in a preferred manner. An example might be to turn off lights while the device is in the sun being charged to save power.

In some embodiments, the electrical device 100 can be designed such that it is pocket-able so that it can be carried easily and used anywhere.

In some embodiments, the electrical device 100 can be designed such that it has a large capacity battery so that it can power larger or higher power external devices.

In some embodiments, the electrical device 100 can house a light as part of its structure or have no light.

In some embodiments, the electrical device 100 can power lights externally.

In some embodiments, the electrical device 100 can have other features built into it and managed and powered by its unique combination of structures.

In some embodiments, the light from the electrical device 100 could utilize white LEDs to allow for solid state lighting and low power consumption.

In some embodiments, the connectors of the electrical device 100 could be common connector types, such as miniature power jacks or audio jacks. Use of the same connectors would enable local users to craft their own cables of custom lengths from readily available materials.

In some embodiments, the output connections of the electrical device 100 can be monitored for conditions outside the desired range, such as over-load, and shut off or limited as desired.

In some embodiments, the input connections of the electrical device 100 can be monitored for conditions outside the desired range, such as over-drive, and shut off or limited as desired.

In some embodiments, the electrical device 100 can have one or more output bus connections enabling external devices to be connected. These bus connections can be idealized for the type of device connected.

In some embodiments, the output buses of the electrical device 100 can be controlled by the intelligent controller and allow for feature or circuit behavior to be determined by the control circuit. Example features might include turning lights on and off or dimming them, or controlling fan speed.

Figure 6:
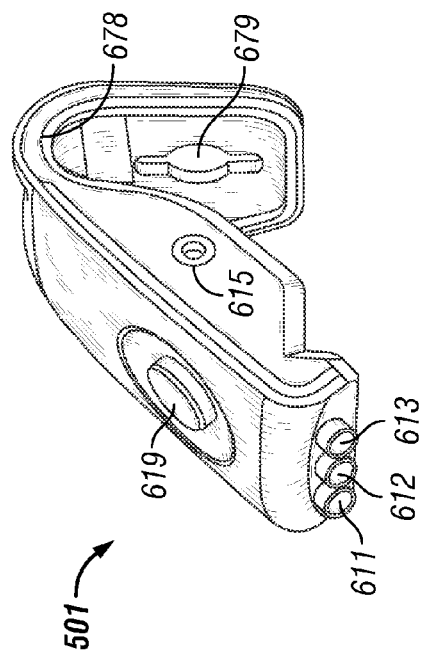
FIG. 6 illustrates a right, front isometric view of electrical device 501, according in one embodiment.
Figure 8:
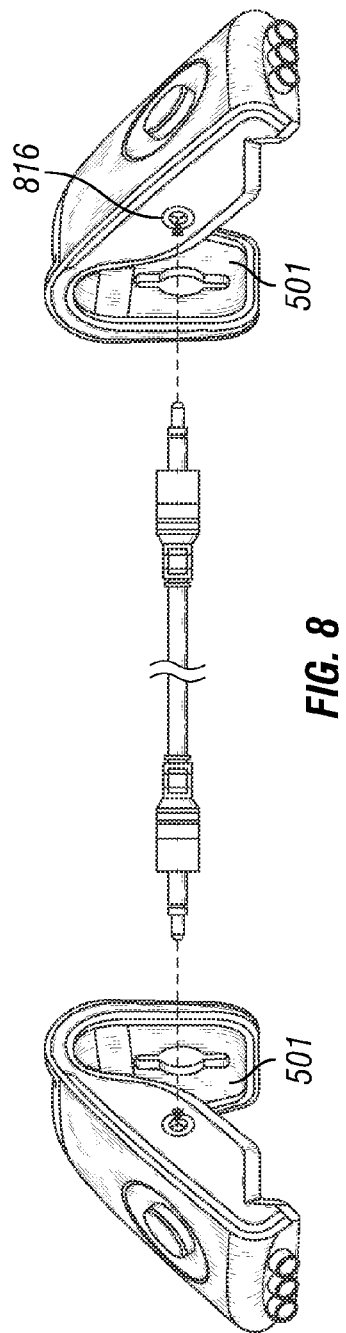
FIG. 8 illustrates an example of the electrical coupling of two electrical devices 501 configured to be connected in series, according to one embodiment.
Figure 9:
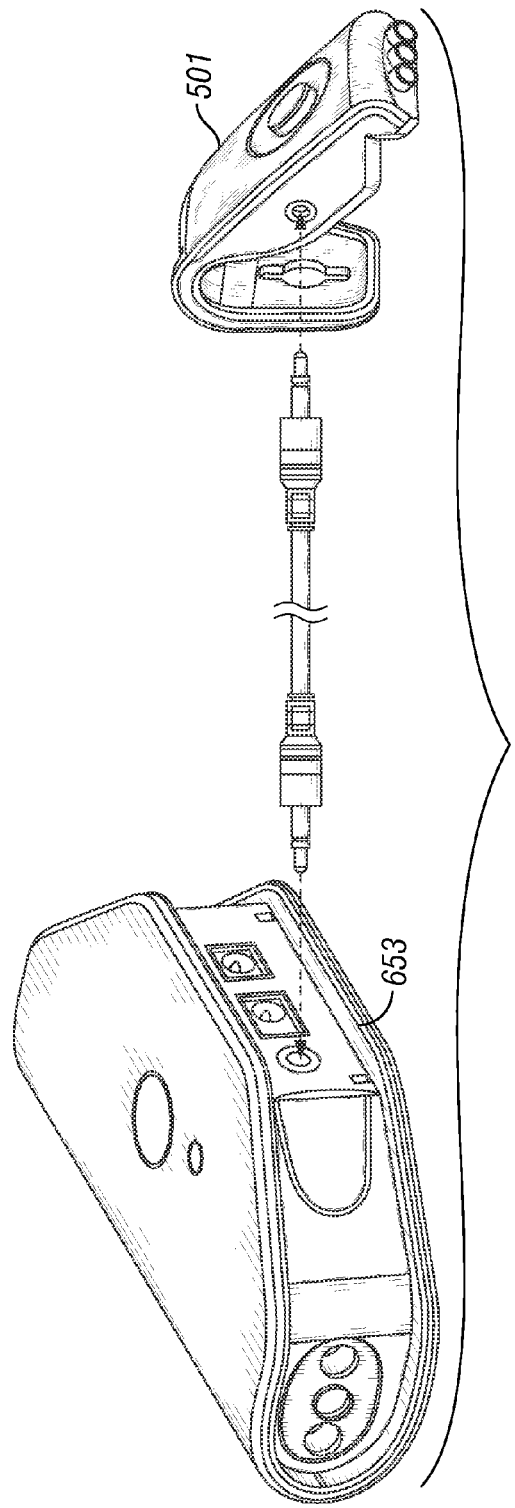
FIG. 9 illustrates an example of electrical device 501 coupled to a power source 653, according to one embodiment.
Figure 17:
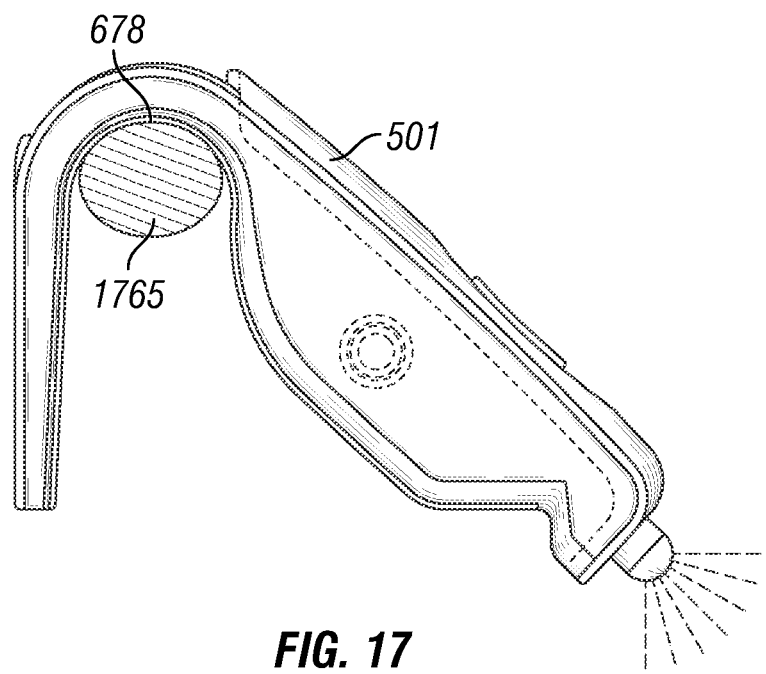
FIG. 17 illustrates another example of a use of electrical device 501 hung over a line such as a cable or rope or wire, according to one embodiment.

As shown in FIG. 6, the electrical device 501 can include: (a) one or more light sources 611, 612, and 613; (b) a user input mechanism 619; and (c) one or more connectors 615 and 816 (FIG. 8). The electrical device 501 can also include one or more elements or apertures 679 configured to allow electrical device to be coupled to a wall or other surface. As shown in FIGS. 6 and 17, the electrical device 501 also includes a curve 678 that allows the electrical device 501 to be mechanically coupled to a tubular item 1765 (e.g., a rope).

Figure 7:
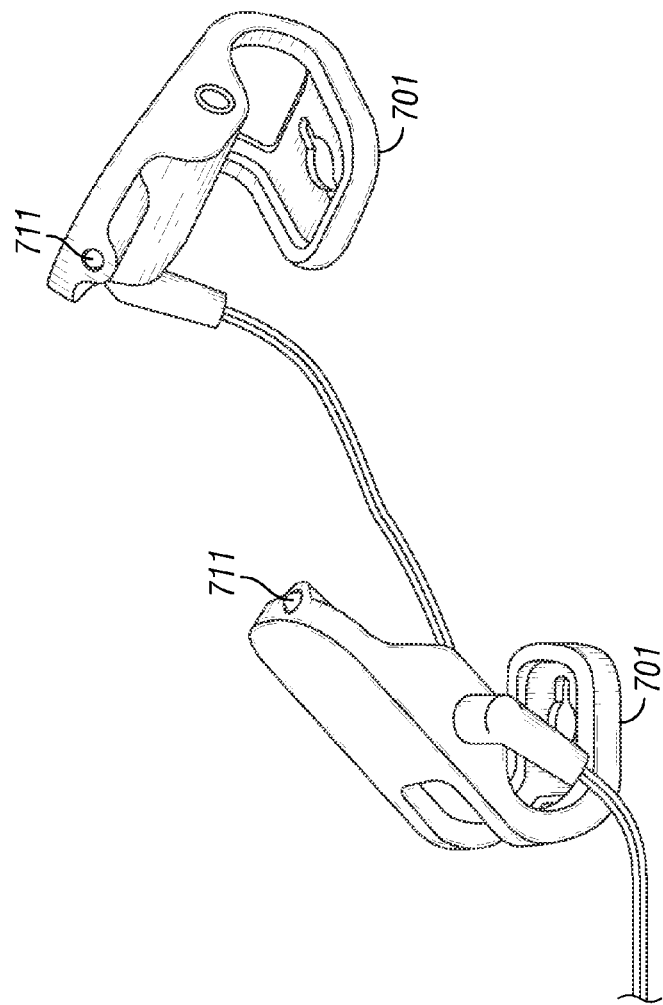
FIG. 7 illustrates an example of the electrical coupling of two electrical devices 701 configured to be connected in series, according to one embodiment.

FIG. 7 illustrates two electrical devices 701. The electrical device 701 is a variation of the electrical device 501 with only one light source 711 and no user input mechanism.

According to one embodiment, a method for providing electric light as a series of light source nodes (i.e., electrical devices 100, 501, and 701) where additional nodes can be added to the chain as desired for improved lighting (referred to here as a "Daisy Chain Lighting"). This method can include a "Daisy Chain Lamp" connected on a "Daisy Chain Bus," which in turn can be powered by a specialized "Daisy Chain Power Output." These techniques collectively enable the means to provide more affordable and more efficient distributed lighting.

Figure 5:
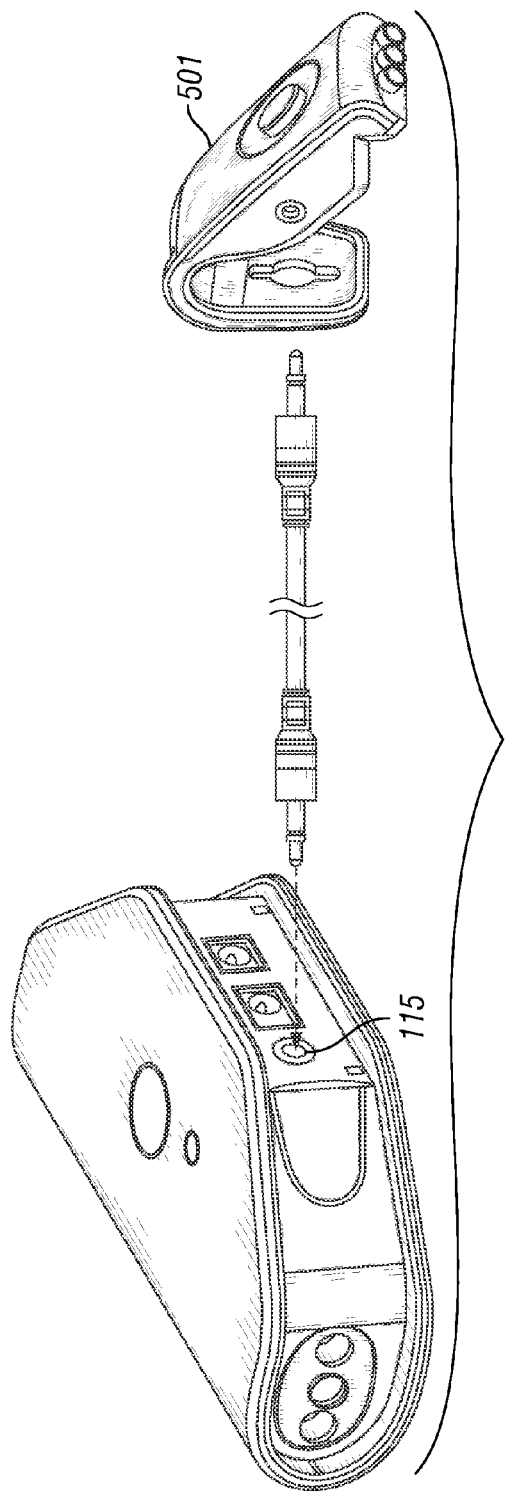
FIG. 5 illustrates an example of electrical device 100 coupling to electrical device 501, according to one embodiment.

In some embodiments, the electrical devices 100, 501, and 701 can be configured such that two or more of electrical devices 100, 501, and 701 can be linked in series physically though their loads are in fact parallel electrically, spaced apart on lengths of electrical cable, distributed as desired around an area or room, and powered from a single power source (e.g., electrical device 100). Each node has a power input connection for its own function and a power output connection that allows another node to be added and powered. The input and output can be connected directly to each other for straight pass through, if desired, which allows for both connections to be input or output as desired. The user can add light by connecting another node to the end of the bus. For example, FIGS. 5, 7, and 8 illustrate examples of coupling the electrical devices 100, 501, and 701.

According to some embodiments, this distribution of smaller nodes of directed light around the room allows for lower energy use because the lighting can be strategically placed to shine on work areas, eating tables, reading areas and entryways for instance. Because light can be less bright and is coming from many sources, the shadows are less stark. Less bright lights allow the room occupants to become more dark adapted and therefore even more comfortable with the widely distributed low light, as opposed to bright light and dark shadows as is the case with a bright central light in a non-reflective environment such as with natural material walls.

Figure 10:
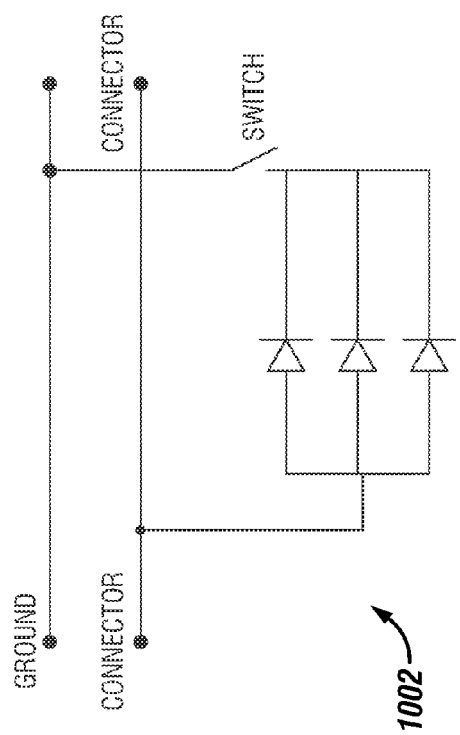
FIG. 10 illustrates a schematic of circuit 1002 of electrical device 501, according to one embodiment.
Figure 11:
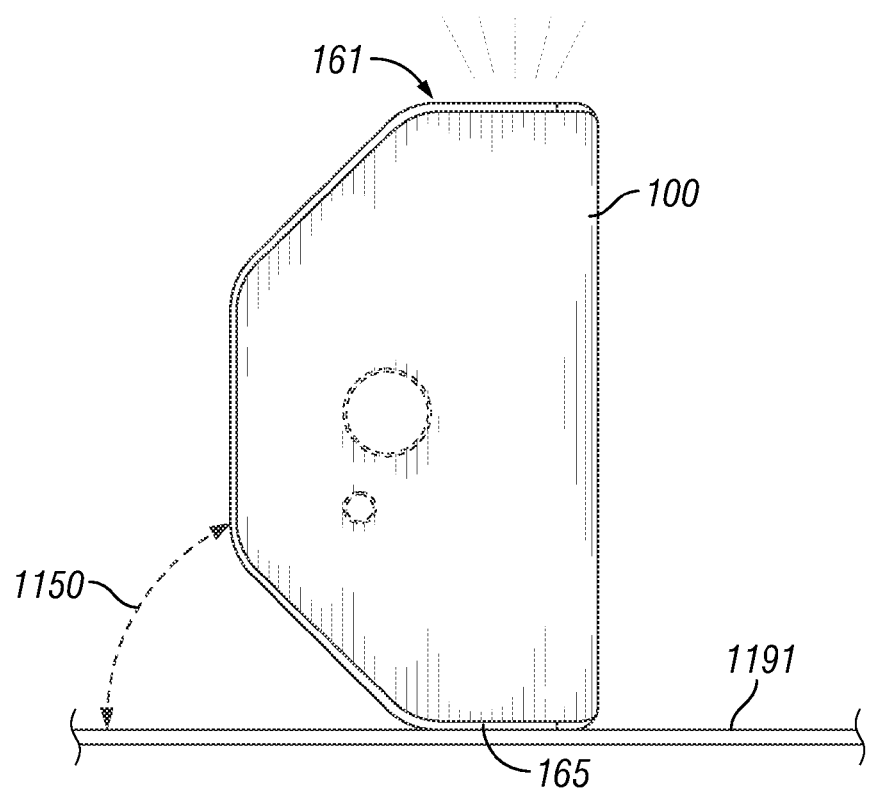
FIG. 11 illustrates an example of a use of electrical device 100, according to one embodiment.

According to one embodiment, this method of linking lights in series and powered from a single source is especially beneficial in cost sensitive environments because the electrical device 100 can provide the electrical power and the protection (regulation, current overload protection, etc) and the circuitry need in the electrical devices 501 and 701 can be minimal. For example, the electrical devices 501 and 701 can be made from nothing more than the wires and lights if desired. FIG. 10 illustrates an example of the circuitry 1002 of the electrical device 501, according to the first embodiment. In some embodiments, the electrical devices 501 and 701 can therefore be very cheap, and more light can be added as it can be afforded. If desired, the light nodes can be high functioning, with modern lighting features such as dimming and sleep (delayed shutoff) modes. These modern control features can also be made as part of the electrical device 100, such that the electrical devices 501 and 701 would still be mechanically minimal, not much more than connectors, lights, and housing. Features such as dimming and timing can be made to be internal to the electrical devices 501 and 701 or managed by the electrical device 100.

In some embodiments, the power source for the electrical devices 100, 501, and 701 can be AC or DC. The light source can be any kind of lamp or LED. In some embodiments electrical power is applied to each of the lights of the electrical devices 501 and 701 in parallel, which is the same power is applied across all lights, though the lights are strung in series.

In one embodiment, the electrical devices 501 and 701 are small devices with one or more white LEDs that can be hung on a wall or placed on a table or shelf. Each of the electrical devices 501 and 701 might have one, two or more power jacks (mini mono audio jacks for instance) that are coupled to the electrical device 100 (or another power source), either directly or indirectly. In the case of embodiments of the electrical devices 501 and 701 with at least one power in and power out connection, the electrical devices 501 and 701 can be connected to each other so that one light can be plugged into another (perhaps in either direction) to add lights in series (hence daisy chain).

In some embodiments, the lights in the electrical devices 501 and 701 can be turned on and off from the electrical device 100 and they could also have one or more buttons (e.g., user input mechanism 619) to control power or light. The button does not have to affect the power output it can just turn on the local LEDs. In the most minimal implementation, the electrical device does not include a circuit, nor battery, and just includes LEDs, connectors, one or more cables and possible a button. The electrical devices 501 and 7011 can be very cheap. A person buys one and can keep adding more as they can afford it.

In some embodiments, the light in the electrical devices 501 and 701 could be angled at 45 degrees from the mounting surface so, when it is mounted on a wall it will cast light only downward and not waste light. It will then not require to be centered on the ceiling. The light could utilize white LEDs to allow for solid state lighting and low power consumption.

Figure 15:
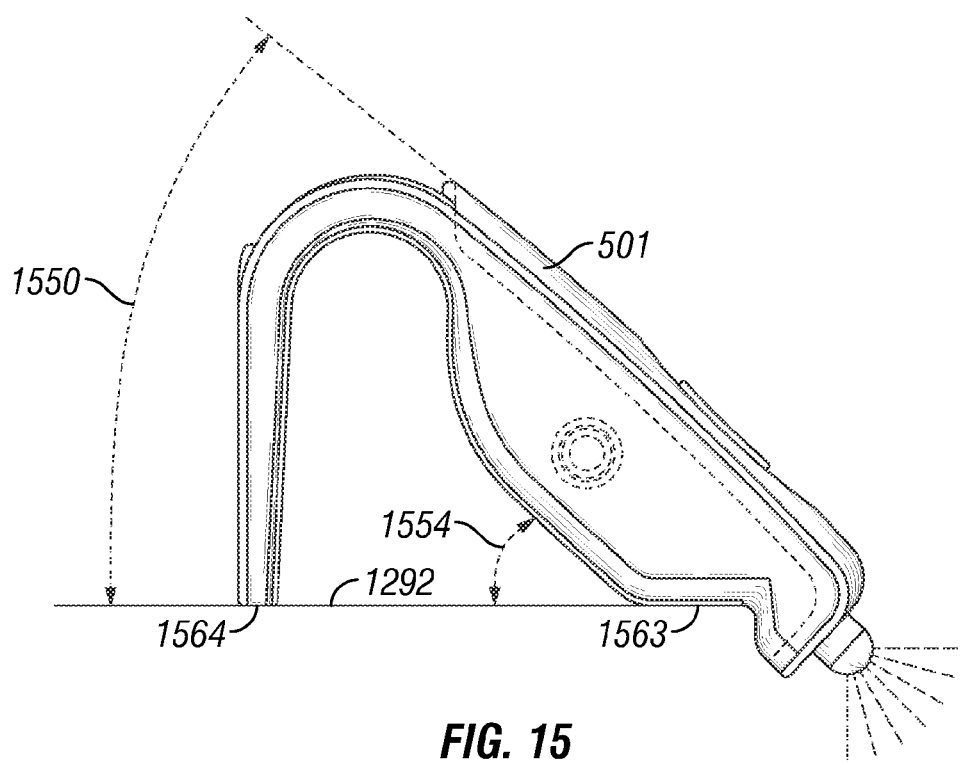
FIG. 15 illustrates an example of a use of electrical device 501, according to one embodiment.
Figure 16:
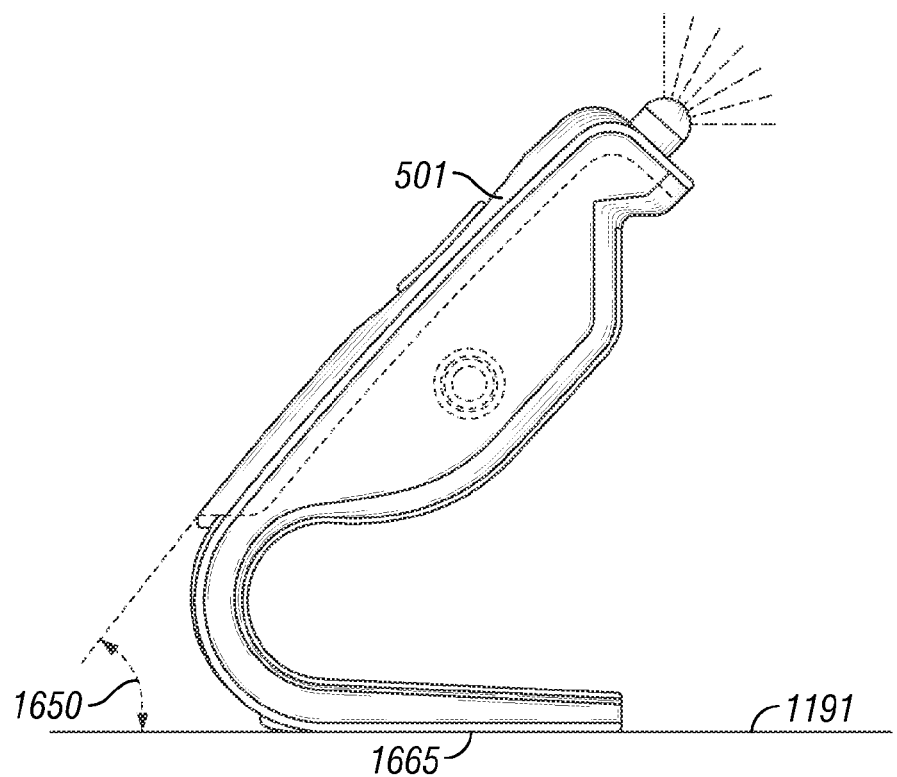
FIG. 16 illustrates a further example of a use of electrical device 501, according to one embodiment.
Figure 18:
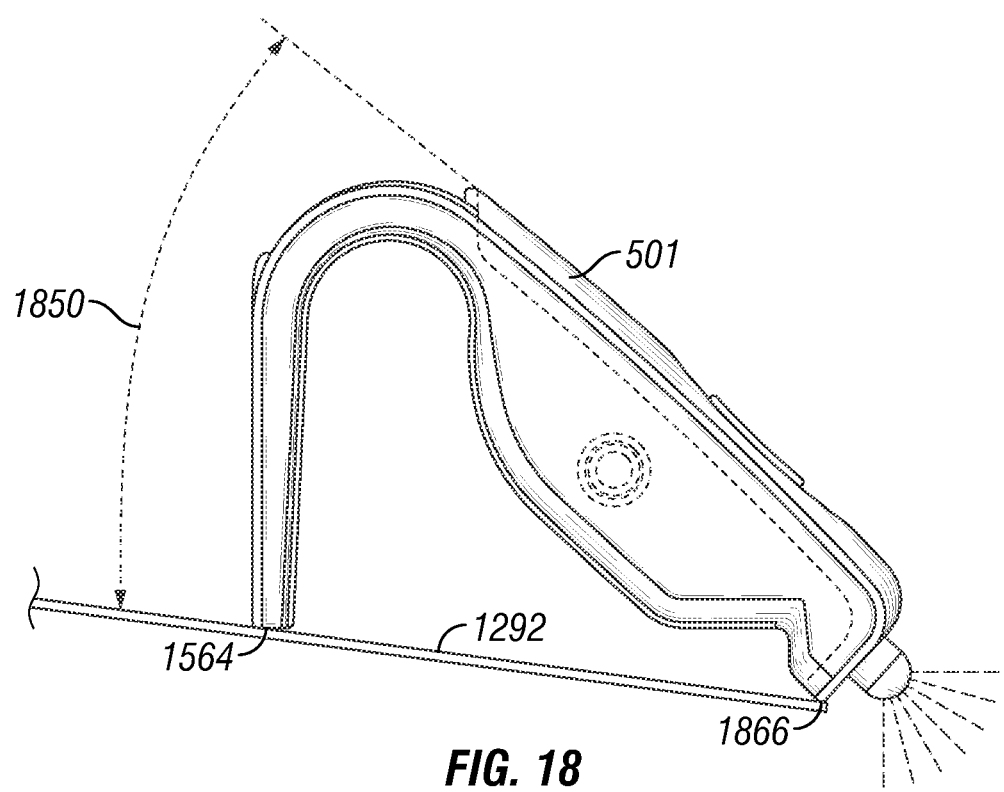
FIG. 18 illustrates a still further example of a use of electrical device 501, according to one embodiment.

Furthermore, as shown in FIGS. 15-16 and 18, various surfaces or sides of the electrical device 501 can rest on the surfaces 1191 (FIG. 16) or 1292 (FIGS. 15 and 18) while providing light. In the example shown in FIG. 15, the surfaces 1563 and 1564 can rest on shelf or the surface 1292, and the electrical device 501 can act as an area light or a ceiling light. In various embodiments, the angles 1550 and 1554 can be approximately 30 degrees or approximately 45 degrees. In other embodiments, the angles 1550 and 1554 can both be between 20 degrees and 60 degrees.

In the example shown in FIG. 16, the side 1665 of the electrical device 501 can rest on the surface 1191. In this embodiment, the electrical device 100 can act as a table lamp. In various embodiments, the angle 1650 can be approximately 30 degrees or approximately 45 degrees. In other embodiments, the angle 1650 can be between 20 degrees and 60 degrees.

In the example shown in FIG. 18, the surfaces 1564 and 1866 of the electrical device 501 can rest on the surface 1292 and the electrical device 100 can act as an area light or a ceiling light. In various embodiments, the angle 1850 can be approximately 35 degrees or approximately 50 degrees. In other embodiments, the angle 1850 can be between 25 degrees and 65 degrees.

In some embodiments, the light in the electrical devices 501 and 701 could utilize white LEDs to allow for solid state lighting and low power consumption.

In some embodiments, the connectors in the electrical devices 501 and 701 could be common miniature jacks, such as audio jacks. Using standard connectors would enable local users to craft their own cables of custom lengths from readily available materials.

In some embodiments, the cable connectors could be topmost when mounted on the wall, on as allow the device to hang below the cable. It might even be mounted by hanging it from its cables and affixing the cables to the wall.

In some embodiments, the connectors could be on opposite sides to allow easier chaining.

In some embodiments, the button could be of the push on push off variety to allow for intuitive on and off selection.

In some embodiments, the button could be located bottommost, so that when hung on the wall it would allow easiest reach.

In some embodiments, the device could have a keyhole eyelet to allow mounting on a screw or nail head.

In some embodiments, the device could have at eyelet on top to allow it in be hung on a nail or screw.

In some embodiments, the device could have a second eyelet or keyhole to allow it to be fixedly attached at both ends In some embodiments, the environment is often a wall in a hut or one room home with rough made ceiling, potentially getting wet, so care could be taken that when mounted vertically water does not easily run into the connectors.

In some embodiments, the device could be kept simple and low cost.

In some embodiments, the node can contain a switch or it can be switched from its source.

In some embodiments, a switch could be located at the first or any cable or at the power source instead of or in addition to in the node to allow for convenient on and off selection.

In some embodiments, the nodes could vary in angle and intensity, for instance wide beam for room/area lighting or focus beam for task lighting, or they could be combinations of types of lighting.

In some embodiments, the nodes can have an internal control circuit for switch debounce and light level control.

In some embodiments, the voltage and current control can protect against bus fault or node failure.

In some embodiments, the daisy chain bus can support other accessories such as a fan or a radio.

In some embodiments, the nodes or the power source could signal on the bus for current load limits, light intensity change or on and off selection.

In some embodiments, the daisy chain devices and their power source could be made to be pocket-able.

In some embodiments, the light notes could be made to be foldable or flat to make them easy to pocket and carry.

In some embodiments, the light nodes could cluster or snap together eliminating the requirement for cables between some or all nodes.

In some embodiments, the nodes could be made to be arranged in rows or columns or grids.

In some embodiments, the nodes could utilize focus or diffusing lenses to direct light as desired In some embodiments, the nodes could utilize reflectors to assure all light is directed where desired.

In some embodiments, the nodes could be affixed to various surface types, using such methods as hardware, Velcro, screws, clips, or other fastener.

In some embodiments, the nodes could be made to have a pushpin backing to make inserting them into the wall easier.

In some embodiments, the nodes could be made water and weatherproof to allow them to be used outdoors or in environments unfriendly to electrical circuits.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An electrical power source and lighting apparatus having one or more inputs and at least a first and second output, the electrical power source and lighting apparatus comprising:
   one or more light sources;
   an input sensor coupled to the one or more inputs and configured to sense the voltage and current of at least a first power input;
   an adaptive buck converter configured to receive the first power input and condition the first power input to generate a conditioned power output;
   a controller coupled to the input sensor and the adaptive buck converter and configured to receive sensed voltage and current values from the input sensor and provide instructions to the adaptive buck converter to condition the first power input to within a predetermined acceptable input threshold;
   an internal power source coupled to the adaptive buck converter and configured to receive and store the conditioned power output from the adaptive buck converter, wherein the internal power source is also configured to generate a stored output;
   an output sensor coupled to the first output and configured to sense the probable voltage and current requirements of a device coupled to the first output; and
   a boost output mechanism configured to receive the stored output from the internal power source, the boost output mechanism further configured to boost the stored output consistent with the requirements sensed at the output sensor.

2. The apparatus of claim 1, wherein:
   the controller is coupled to the output sensor;
   the controller is configured to regularly monitor the current and voltage requirements as measured by the output sensor at the first output; and
   the controller is further configured to differentiate short circuits and voltage excursions at the first output.

3. The apparatus of claim 1, wherein the controller is configured to instruct the adaptive buck converter to operate to maximize the power of the at least a first power input.

4. The electrical apparatus of claim 1, wherein:
   the controller comprises a controller module, the controller module comprising:
      a comparator module;
      a pulse width modulator module;
      a boost regulator module;
      a light source driver module;
      an external power bus driver module;
   a buck regulator module; and
   an intelligent indicator driver.

5. The electrical apparatus of claim 1, wherein the predetermined acceptable input threshold range is approximately zero volts to approximately twenty volts.

6. The electrical apparatus of claim 1 further comprising:
   the second output of the electrical power source and lighting apparatus configured to output a substantially constant voltage; and the second output coupled to an output sensor, wherein the output sensor is either the first output sensor or a second output sensor.

7. The electrical apparatus of claim 1, further comprising:
a plurality of constant voltage outputs configured to output a constant voltage;
a plurality of adaptive voltage outputs configured to output a variable voltage;
the plurality of constant voltage outputs, the plurality of adaptive voltage outputs, the output sensor, and the controller being configured to support a plurality of concurrent connections to the plurality of constant and adaptive outputs, wherein the constant voltage outputs require different voltages and/or currents than the adaptive voltage outputs.

8. The electrical apparatus of claim 7, wherein:
the voltage at a first constant voltage output is substantially five volts;
the voltage at a first adaptive voltage output is substantially 3.6 volts; and
the voltage at a second adaptive voltage output is substantially twelve volts.

9. The electrical apparatus of claim 1, further comprising:
a housing comprising:
 a first side comprising at least one of the one or more light sources;
 a second side at a first angle with the first side;
 a third side at a second angle with the first side;
 a fourth side at a third angle with the first side; and
 a fifth side opposite the first side.

10. The electrical apparatus of claim 1 further comprising:
an actuator;
two or more light sources; and
the actuator is configured to:
 activate and deactivate a first light source; and
 activate and deactivate a second light source.

11. The electrical apparatus of claim 10, wherein the first light source is a narrow beam LED and the second light source is a wide beam LED.

12. The electrical apparatus of claim 10, further comprising a plurality of actuators configured such that there is an actuator for each output, and the actuator for each output is configured to activate and deactivate the outputs.

13. The electrical apparatus of claim 1 further comprising an intelligent signal indicator configured to indicate the status of the internal power source.

14. A system for providing light, the system comprising:
a first electrical device comprising:
 an internal power source configured to provide a first electrical power with a first voltage;
 one or more first electrical connectors;
 an output sensor configured to detect the probable voltage requirements of any devices connected to the one or more first electrical connectors;
 a voltage boost module configured to boost the first voltage to a second voltage based upon the probable voltage requirements detected by the output sensor; and
 one or more first light sources;
a second electrical device comprising one or more second tight sources and one or more second electrical connectors configured to electrically couple to at least one of the one or more first electrical connectors; and
a third electrical device comprising one or more third light sources and one or more third electrical connectors configured to electrically couple to at least one of the one or more second electrical connectors.

15. The system of claim 14, wherein:
the first electrical device further comprises a charging output;
further wherein a fourth electrical device is connected to the first electrical devices charging output; and
wherein the operational voltage of the fourth electrical device is substantially five volts and the operational voltage of the second and third electrical devices is substantially 3.6 volts.

16. The system of claim 15, wherein the second electrical device is a light and the fourth device is a mobile phone.

17. The system of claim 14 further comprising:
an external power source;
the first electrical device being configured to receive power from the external power source, and being further configured to perform intelligent buck conversion on the received power to a range acceptable to the internal power source.

18. The system of claim 17 wherein the external power source comprises a solar panel.

19. A method of powering electrical devices, the method comprising:
coupling a first electrical device to a first output of an electrical power source and lighting apparatus, the electrical power source and lighting apparatus comprising one or more light sources;
sensing the probable voltage and current requirements of the first electrical device with an output sensor coupled to the first output;
boosting an output power from an internal power source located in the electrical power source and lighting apparatus, wherein the boosting is controlled by a controller coupled to the output sensor such that the output power is consistent with the sensed voltage and current requirements;
coupling an external power source to a first input of the electrical power source and lighting apparatus;
sensing the voltage and current of the external power source with an input sensor located in the electrical power source and lighting apparatus;
conditioning a power input from the external power source with an adaptive buck converter to within a predetermined acceptable input threshold;
generating a conditioned power output with the adaptive buck converter; and
storing the conditioned power output in the internal power source.

20. The method of claim 19 further comprising:
coupling a second electrical device to a second output configured to output a substantially constant voltage;
coupling a third electrical device to the first electrical device;
sensing a change in the probable voltage and/or current requirements at the first output; and
boosting the output power to meet the changed probable voltage and/or current requirements.

21. The method of claim 19 further comprising:
activating a first light source with an actuator arranged on the electrical power source and lighting apparatus, the first light source being a narrow beam LED; and
activating a second light source with the actuator, the second light source being a wide beam LED.

* * * * *